Nov. 24, 1953  M. E. TOELCKE  2,660,441
COLLET CHUCK
Filed July 12, 1951
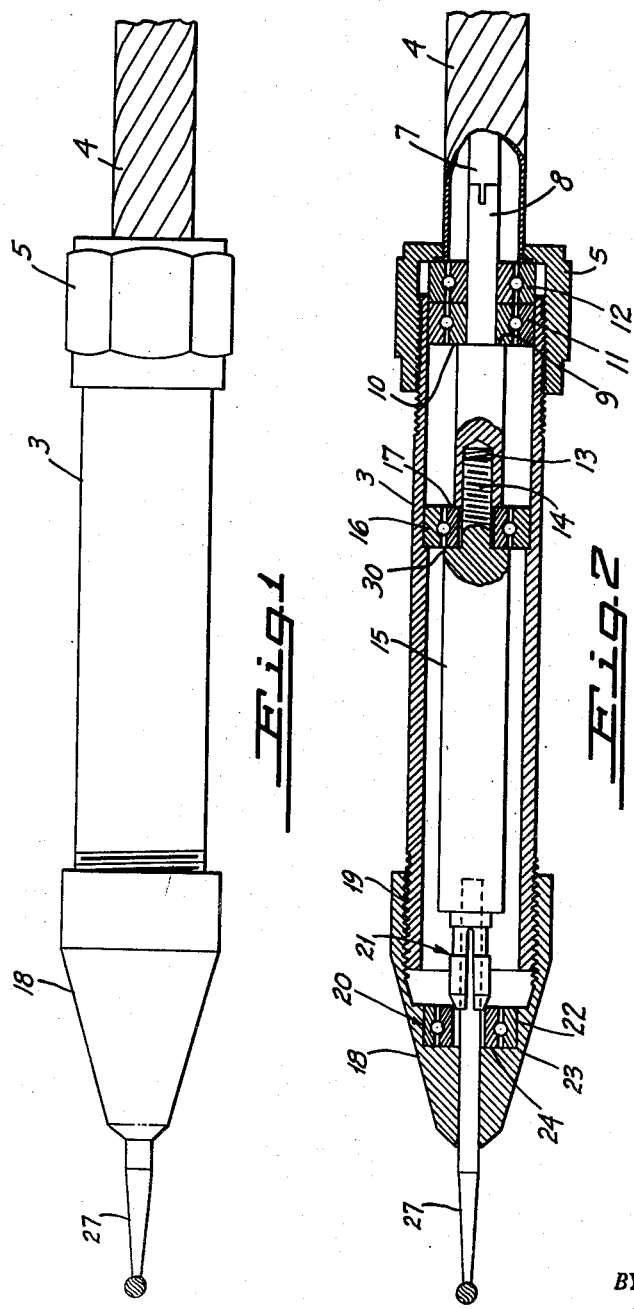
INVENTOR.
Magnus E. Toelcke
BY
ATTORNEYS Patented Nov. 24, 1953

2,660,441

UNITED STATES PATENT OFFICE 2,660,441

COLLET CHUCK

Magnus E. Toelcke, San Jose, Calif.

Application July 12, 1951, Serial No. 236,389

3 Claims. (Cl. 279—42)

This invention relates to a collet chuck, particularly one intended for the holding of light objects such as dental drills and the like which operate at high speeds and which are used for very delicate and very accurate work.

It is in general the broad object of the present invention to provide an improved chuck construction, one wherein the several jaws comprising the collet can be readily opened and closed and wherein any friction of the moving parts of the collet chuck are held to a minimum.

The invention includes other objects and features of advantage, some of which, together with the foregoing, will appear hereinafter wherein the present preferred form of collet chuck of this invention is disclosed.

In the drawing,

Figure 1 is a side elevation illustrating the collet chuck embodying this invention.

Figure 2 is a side elevation in partial section.

The chuck of this invention includes a shank member 3 mounted on an end of a flexible cable 4 by a nut 5, as is usual, for example, in a dental drill. A shaft 7 in the flexible cable is joined to a second shaft 8 which extends into the shank member. The shaft 8 has a shoulder 9 thereon fitting against an inner race 10 in a first ball bearing 11 to take up end thrust. A second ball bearing 12 is positioned between the first ball bearing 11 and nut 5 to support the shaft for rotation. Second shaft 8 has a threaded receptacle 13 therein to receive threaded end 14 on collet shaft 15, a third ball bearing 16 being mounted on threaded end 14 with its inner race 17 held between shoulder 30 on shaft 8 and the end of shaft 15 and its outer race engaged with a shoulder on the shank member.

A nose piece 18 secured by threads on the other end of the shank. A fourth ball bearing 20 is mounted in the nose piece, this bearing being adjacent chuck collet 21. The ball bearing 20 mounted in the nose piece includes a race 22 fixed in the nose piece and having balls 23 mounting a second race 24 therein. The collet includes several jaws 26 which are tapered to engage nose 24. Upon rotation of nose piece 18 on the shank, the collet jaws can be opened or closed to retain a dental burr 27 or like tool therein, as desired, while the collet is supported for rotation with accuracy and a minimum of friction drag.

From the foregoing, I believe it will be apparent that I have provided a novel, improved and simplified form of collet chuck.

I claim:

1. In a chuck, a shank member, a nose piece member threadedly mounted on the shank member, a shaft, a collet member mounted on an end of the shaft and having a plurality of collet jaws, bearings supporting the shaft for rotation in the shank member, and a bearing in the nose piece and engaged with the collet jaws and including a rotatable element directly engaged with the collet jaws and movable with the nose piece to close said jaws and to permit said jaws to open.

2. In a chuck, a shank member, a nose piece member threadedly mounted on the shank member, a shaft, a collet member mounted on an end of the shaft and having a plurality of collet jaws, bearings supporting the shaft in the shank member, and a bearing in the nose piece including a first bearing element fixed to the nose piece and a second bearing element rotatable on the first bearing element and directly engaged with the collet jaws and movable with the nose piece to close said jaws and to permit said jaws to open.

3. In a chuck, a shank member, a nut on one end of said shank member, a first shaft, a thrust bearing supporting an end of said first shaft in said nut, a second shaft secured to the first shaft, a bearing mounted in said shank member and including an element fixed between said shafts, a nose piece threadedly mounted on the other end of said shank member, a collet chuck having a plurality of movable jaws mounted on an end of said second shaft, and a ball bearing mounted in said nose piece and having an inner race directly engaged with the collet chuck to close its jaws and to permit said jaws to open upon movement of the nose-piece on said shank member.

MAGNUS E. TOELCKE.

References Cited in the file of this patent

UNITED STATES PATENTS

| Number | Name | Date |
|---|---|---|
| 466,462 | Hammond | Jan. 5, 1892 |
| 550,113 | Sibley et al. | Nov. 19, 1895 |
| 1,160,805 | Wood | Nov. 16, 1915 |
| 1,380,716 | Herman | June 7, 1921 |
| 1,930,131 | Padgett | Oct. 10, 1933 |
| 2,345,069 | Phillips | Mar. 28, 1944 |
| 2,460,302 | Lundsten | Feb. 1, 1949 |
| 2,542,693 | McGlinchey | Feb. 20, 1951 |